United States Patent [19]
MacKenzie

[11] 3,811,851
[45] May 21, 1974

[54] METHOD OF MAKING FOAMED GLASS PRODUCTS WITH EXCRETA AND GLASS BATCH

[75] Inventor: John D. MacKenzie, Los Angeles, Calif.

[73] Assignee: The Regents of the University of California, Berkeley, Calif.

[22] Filed: July 5, 1972

[21] Appl. No.: 268,999

[52] U.S. Cl.................... 65/22, 106/40 V, 106/41
[51] Int. Cl............................................. C03b 19/08
[58] Field of Search.......... 65/22; 106/41, 40 V, 87, 106/122

[56] References Cited
UNITED STATES PATENTS

| | | | |
|---|---|---|---|
| 362,759 | 5/1887 | Marx | 106/41 |
| 520,266 | 5/1894 | Maurer | 106/41 |
| 2,156,457 | 5/1939 | Long | 106/40 V X |
| 2,233,608 | 3/1941 | Haux et al. | 106/40 V |
| 3,288,615 | 11/1966 | Estes et al. | 106/41 X |

Primary Examiner—Robert L. Lindsay, Jr.
Attorney, Agent, or Firm—Nilsson, Robbins & Berliner

[57] ABSTRACT

An improved method of making glass products is provided which comprises mixing particulate glass with a selected treating agent comprising heat treated excreta to form a unique glass mix. The glass may be of any type, such as used-container glass which has a preselected approximate concentration range of foreign inclusions and an average reflectance of about 5 percent to about 95 percent, the reflectance of the single colored glass being arbitrarily considered as 0 percent whereas that of the white glass being 100 percent. The mix is heated to a temperature and pressure above the annealing and softening point of the glass but below its melting point and within a range sufficient to activate the treating agent to either foam or fill the glass. In the latter case, increased pressure is applied to form the glass into a hard pressed product, such as tile, of unique composition. In the former case, foamed glass of unique composition is produced. The used-container glass utilized in one embodiment includes a plurality of particles of various colors which imparts a distinctive appearance to the finished product. Pressed products may also have oxide pigments embedded in the surfaces thereof.

13 Claims, No Drawings

METHOD OF MAKING FOAMED GLASS PRODUCTS WITH EXCRETA AND GLASS BATCH

FIELD OF THE INVENTION

The present invention generally relates to glass and more particularly to glass products incorporating heat treated excreta in selected concentration ranges.

BACKGROUND AND SUMMARY OF THE INVENTION

The disposal of animal excreta presents a substantial and increasing ecological problem. Vast quantities of human excreta are processed daily in city and county sewage treating plants by procedures which result in their precipitation and sterilization to form so-called sewage plant cakes. For example, the city of Los Angeles, California produces 150 tons of such cake per day, and Orange County, California 200 tons of such cake per day. Moreover, the cakes normally are not employed as fertilizers but, instead, are left to pile up in drying areas until they can be hauled away and dumped into disposal pits or the like.

Similarly, in California alone 1 million tons of solid cattle feedlot animal excreta is produced annually, most of which is merely piled up to dry and whether in the sun, forming undesirable, hard-to-handle mounds. Like quantities of solid sheep, hog and other feedlot livestock excreta and of solid poultry excreta also accumlate annually and present a serious disposal problem. Little of such solid excreta is used for any useful purpose. The same situation arises on the farm, on the range and elsewhere with respect to excreta from livestock of all types horses concentrated in stables at race courses.

Various sanitary problems are involved with accumulation of animal excreta. As an example, it should be noted that it is a common practice to fatten certain livestock and poultry by adding massive doses of synthetic hormones such as diethyl stilbestrol to their diets. Animals so fattened are than held up to two weeks or so until their tissue content of such ingested hormones is reduced to below permissible levels. Such reduction in content of ingested hormones occurs in part by excretion. However, such hormones can be leached from the excreta by water and can pass therein into water supplies later used for drinking purposes. Water sterilization procedures such as chlorination have no appreciable effect on the viability of such hormones, so that they may be imbibed with the drinking water, a very desirable situation.

Accordingly, it would be desirable to provide an effective and economical method of utilizing much of the vast quantities of animal excreta accumulating daily. Preferably, such method should be adaptable for use with solid excreta such as human excreta, livestock excreta and poultry excreta, as well as other applicable solid excreta and should eliminate sanitation problems such as those referred to above.

Used glass containers have also become a waste disposal problem of immense magnitude. In California alone, some 50 million bottles are discarded each week. Current efforts to solve the ecological problem created by such large quantities of waste glass have largely been directed to reclaiming the glass by procedures which typically involve sorting the glass containers by color and type, then removing all foreign materials, such as cellulosic labels, and metal caps, metal retaining strips and the like therefrom and finally remelting the bottles. The sorting and cleanup procedures before the remelting are expensive and time consuming so that, to date, recycling of glass has only been carried out on a very limited scale, such as 1 percent of discarded containers.

Container glass is also recycled by crushing it to a fine granular form, usually after removing metallic caps, strips and the like therefrom, and then adding the granulated glass as a filler in minor proportions to asphalts and tars. The resulting mix is used as a durable paving material. Such usage thus far also has not been sufficiently extensive to counteract an increasing need to clean up the environment, as by the development of economically attractive procedures and uses for used glass containers and other forms of waste glass. Such new procedures should involve inexpensive reclaiming steps so as to encourage their widespread and extensive application to the vast quantities of waste glass accumulating week by week. It would be highly desirable to provide an effective method of reclaiming glass of all types, including used-container glass, which could utilize substantial concentrations of processed solid excreta, thereby reducing the existing disposal problem of both types of materials.

The present invention is substantially as set forth in the Abstract above. In this regard, an improved method of making glass is provided which satisfies all of the foregoing needs and requirements. Such method employs a novel mix incorporating glass of any type, including used-container glass, and which employs substantial amounts of particulate heat treated excreta. Products thereof are capable of being used extensively in the construction and other industries and are of distinctive appearance. Moreover, the method is inexpensive, simple and effective. The products of the method can be made in the form of foamed glass or in the form of pressed products such as tiles, bricks and the like.

Foamed glass products of the present invention can be provided in a wide range of densities, sizes, shapes and appearance by varying the foaming and molding parameters. Such products have excellent thermal, sound and electrical insulative properties and are non-flammable, strong, light, chemically resistant and durable. Moreoever, foamed glass products of the present invention, including those employing used-container glass, have a distinctive appearance, texture and reflectance. Accordingly, the foamed glass products of the invention can be used both as structural and as decorative materials and in a variety of other applications.

Pressed products such as tiles, bricks and the like, in accordance with the present invention are useful as decorative and structural coverings for floors, walls furniture and the like. Their unique appearance depends on the use of heat treated excreta in the glass, with or without used-container glass being present. Such appearance can be varied easily by the addition of certain inclusions to the product surfaces during processing. Such pressed finished products are hard, durable, impact resistant, light in weight and inexpensive. Their extensive use along with foamed glass products of the invention will substantially favorably affect the environment by reducing the available quantities of waste glass and excreta, such as human excreta, solid livestock excreta and solid poultry excreta.

The solid excreta utilized in the present invention is that which has been heat treated in accordance with the procedure set forth in my copending U.S. Pat. application, Ser. No. 268,972 filed of even date with the present application. Such heat treated excreta comprises heat treated solid animal excreta such as heat treated human excreta, heat treated livestock excreta and heat treated poultry excreta, as well as other types of heat treated solid animal excreta of like nature and composition. As hereafter used herein, the term heat treated excreta includes all of the above types.

The described procedure involves heating of solid excreta in a closed system at temperatures of about 200°–1,000°C for a time sufficient to remove volatiles therefrom and to increase the percentage of carbon in the solid residue up to about 15–50 percent by weight. The resulting heat treated animal excreta has no viable hormones therein, but has properties which render it suitable as a foaming agent and as a filler for glass in accordance with the present method. Further features of the invention are set forth in the following detailed description.

DETAILED DESCRIPTION

Mixing

In accordance with the method of the present invention, glass in particulate form is mixed with a selected treating agent comprising particulate heat treated excreta to form the novel mix of the invention.

The glass may be any type of glass, new or used. One type comprises used-container glass which can be prepared from a plurality of the usual types of used glass containers of various sizes, shapes and colors mixed together without previous cleaning or removal of labels and caps, cap remnants, such as sealing strips of metal, plastic and the like materials. This mixture of glass containers is particulated in the unsorted state to any desirable particle size, along with the caps, strips, labels and the like to provide particulate used-container glass having the following approximate concentrations of foreign inclusions:

| Inclusions | % by weight in glass (range) |
| --- | --- |
| Fe | 0.1 to 3% |
| Sn | 0.1 to 2% |
| Al | 0.1 to 2% |
| Other metals | 0.1 to 1% |
| Cellulosics | 0.1 to 1% |
| Other organics | 0.1 to 1% |

Moreover, the particulate used-container glass is also identified by having its average reflectance of about 5 percent to about 95 percent and its multi-colored appearance. The relative reflectance will vary with particle size. However, for every range of particle size, so long as the range is kept constant, the white, plain glass reflectance is taken at 100 percent and the colored glass reflectance is taken at 0 percent.

The particulation of the glass containers to form the used-container glass can be achieved by any suitable means, as by grinding, pressing and crushing, ball milling or the like. No sorting, grading or preselecting need be carried out before or after the particulation. Usually, the particulation reduces the glass and inclusions to an average particle size of about 5 to about 200 mesh, for example, 100 mesh, although other particle sizes sufficient to produce desired blending can be provided.

Other types of glass, such as waste plate glass, cullet and the like can also be used in the present method. Preferably, however, the glass is a waste glass which heretofore has not been heretofore reclaimed in substantial quantities.

The selected treating agent comprises particulate heat treated excreta derived from sewage plant cake, livestock excreta and poultry excreta, as well as other types of comparable general composition. By human excreta is meant solid human excreta, preferably after sewage plant processing. Such processing normally provides a final sterile solid product in the form of "cake." Livestock excreta in solid form is most readily available from cattle feedlots, although sheep pens, hog pens and the like also form ready sources of suitable excreta. Poultry farms provide a source of less desirable but still utilizable solid excreta. Farms and other animal raising areas are also suitable sources of such excreta.

In each instance, the solid excreta is particulated and then heat treated in a closed zone, such as a flame heated retort, at about 200°C to 1,000°C, usually about 300°C to about 600°C for a time sufficient, usually about 15 mins. to about 12 mins. to drive off most volatiles. Such volatiles usually are removed from the heating zone as they are generated. The heat treating is continued within the desired temperature range until the carbon content of the solid residue has increased to about 15–50 weight percent, usually about 15–35 weight percent. Such residue when cooled, is used as the heat treated excreta in the present method. Further details of the excreta heat treating procedure are as set forth in my copending United States Patent Application referred to above.

When the starting material for the heat treating is human sewage cake, the heat treated residue may have the following typical approximate composition:

| Constituents | Weight-% |
| --- | --- |
| Carbon | 17.5 |
| Hydrogen | 1.7 |
| Silicon | 14.7 |
| Aluminum | 1.0 |

Typical heat treated excreta derived from cow dung has the following approximate composition:

| Constituents | Weight-% |
| --- | --- |
| Carbon | 31 |
| Silicon | 10 |
| Aluminum | 3 |
| Hydrogen | 2 |

The composition, of course, will vary, depending upon the excreta source, the treating temperature and the treating time.

The selected treating agent may be used as a glass foaming agent and/or filler, filler concentrations being employed when hot pressed products are desired. When the heat treated excreta is used as a foaming agent, usually it is present in the mix in a concentration of about 0.5 to about 10 percent by weight of the combined mixture, although other suitable concentrations could be employed, if desired. It will be understood that mixtures of foaming agent of the invention together with conventional foaming agents in solid and/or liquid form can be used in such mix. Moreover, conventional fillers which do not materially impair foaming and pigments and the like conventional additives can also be present in the mix, but those additives form no part of the present invention.

The treating agent can also be used as a filler in the mix and when so used is usually present in a concentration in the mix of about 10 to about 80 percent by weight of the mix, preferably about 40 to about 60 percent of the mix, although other concentrations can be employed, if desired. For such purposes, such conventional fillers as clays, asbestos, fiberglas and the like can also be added to the mix. Other materials such as pigments, texturizing agents and the like can also be used in the mix.

The mixing of the treating agent and particulate glass should be sufficient to uniformly blend these ingredients together. The treating agent is in a solid particulate form, for example, of about 100 mesh or the like. The glass should be in particulate form, for example, of about 40–100 mesh or the like, depending on the end use and processing steps to be carried out. The mixing can be effected by mechanical stirring, regrinding, tumbling or other conventional means. The resulting novel mix can be sold as such, ready for conversion to useful glass products on application of with or without pressure.

Heating and Holding

The mix so obtained is, in accordance with the present method, placed in a suitable container, such as a mold or the like, and heated to a temperature and pressure within a range sufficient to soften the glass component thereof and activate the treating agent but insufficient to melt the glass. The mix is then held within that range until the treating agent is activated and the desired product is obtained.

Usually, the identifiability of the glass particles is retained while coalescing the same into a strong unitary structural mass. If the glass is heated sufficiently to thoroughly melt it, there is an unnecessary waste of heat. Moreover, when used-container glass is used, generally it is desirable to maintain the glass particles in identifiable form so that the products will have a distinctive multi-colored appearance. Accordingly, the treating temperature is usually kept in the range of about 500°–1,000°C, most usually about 600°–900°C, while treating pressures of from about 10 psi to about 10,000 psi are applied, depending upon the particular properties desired in the finished product.

The residence time of the mix at treating temperature and pressure varies, depending on the results desired, but generally is long enough to allow the treating agent to fully act on the mix. Typical residence times for foaming applications are about 2 mins. to about 120 mins., while typical residence times for pressing operations are about one second to about 60 minutes.

In the event that a foamed glass product is desired, the treating agent acts as a foaming agent and the usual treating parameters are a temperature of about 600°–900°C and about atmospheric pressure. The treating agent is activated at the treating temperature and pressure to cause the softened glass to expand. The extent of foaming depends on the concentration of treating agent, and treating temperature, pressure and residence time. The extent of foaming can be controlled to produce products having densities of from about 0.1 gm/cc to about 2.0 gm/cc.

The surface texture of the foamed glass product can be controlled, as by smoothing it mechanically while in the softened state, or by applying a smooth surfaced top cover to the mold or other container in which the mix is heat treated, so that the glass contacts the cover before cooling thereof to a solid state.

When a pressed product is desired, pressing of the mix during heat treating is effected to coalesce the filler (treating agent) with the glass particles and weld the glass and filler into a unitary mass, in some instances with the particles thereof still retaining their relative positions. After cooling to below the solidification point thereof, a hard finished pressed product in the nature of a tile, brick, sheet or the like is obtained. For such purposes, the pressing can be at up to about 10,000 psi or more, and can be carried out in any suitable means, such as through the use of a movable cover pressed downwardly under hydraulic pressure within a mold in which the mix is heat treated. Other suitable pressing means can be employed.

The hot pressing can be supplemented by applying to surfaces(s) of the mix or pressed product pigments in the form of inorganic oxides such as ferric oxide, lead oxide or the like and/or metals and/or sheet(s) of glass to which the mix or pressed product can be bonded under suitable heat and pressure to provide a finished product of controlled appearance. Typical pressures and temperatures are those within the described heat treating ranges.

Cooling and Recovery

The foamed or pressed glass product is then cooled to below the solidification point thereof, as by turning off the heat to the heating zone and allow the product to cool gradually, for example overnight, or by transferring the product to a cooling zone wherein heat is more rapidly removed. The cooled glass product is then recovered in a condition ready for use. Annealing of the product, particularly in the case of a foamed product, by heating to conventional annealing temperatures and pressures can be employed, if desired, to relieve internal stresses.

Accordingly, improved glass products of distinctive appearance are provided in accordance with the present invention. Certain other features of the present invention are illustrated in the following Examples.

EXAMPLE I

In a first run, 100 lbs. of a typical mixed lot of unsorted, uncleaned, used glass containers, including labels, cap strips, caps and the usual associated materials, are ground and sieved to an average particle size of about 100 mesh, the product having an average reflectance of 20 percent and the following approximate concentrations of foreign inclusions:

| Foreign Inclusions | % by Weight |
|---|---|
| Fe | 0.2 |
| Sn | 0.1 |
| Al | 1.2 |
| Other metals | 0.1 |
| Cellulosics | 0.5 |
| Other organics | 0.4 |

The used-container glass is then mixed with 10 lbs. of particulate heat treated cattle excreta of average particle size of about 100 mesh. Such excreta has previously been subjected in particulate form to heat treating at about 500°C for about 30 mins. in a closed system, with volatiles having been removed therefrom during such heat treating, and such product has the approximate composition set forth below:

| Constituents | Wt. - % |
|---|---|
| Carbon | 31 |
| Silicon | 10 |
| Aluminum | 3 |
| Hydrogen | 2 |

The resulting mixture of particulate used-container glass and particulate heat treated animal excreta product is passed into an open topped mold and is heated therein to about 975°C and is held at about that temperature for about 1 hour, to foam the mixture to approximately 350 percent of its original volume and reduce the density thereof to about 0.25 gm/cc. During foaming, the particles of glass soften (but do not melt), expand and weld together to provide a unitary foamed product. Thereupon, the foamed product is allowed to cool over about 1 hour to room temperature and the mold is stripped therefrom. The finished product has a unique, dark, mottled appearance with an average reflectance of about 25 percent, and tensile strength of about 150 psi. It is useful as a structural and decorative material, can be sawed, drilled, ground or otherwise worked, and is resistant to water, chemicals and wear.

In a parallel run, the procedure of the first run is used, the heat treated animal excreta having been prepared by heating solid particulate hog excreta to about 450°C and holding the excreta at about that temperature in a closed system, while removing volatiles, for about 30 mins. The heat treated excreta has the following approximate composition:

| Constituents | Wt. - % |
|---|---|
| Carbon | 40 |
| Silicon | 9 |
| Aluminum | 2 |
| Hydrogen | 1 |

Such treating agent is used in a concentration of about 8 lbs. Heat treating of the mix is effected at about 875 for about 30 minutes at about atmospheric pressure and the surface of the foamed glass product is smoothed mechanically before cooling of the product to below its solidification point. The finished product is of a distinctive, multi-colored hue, metallic inclusions being clearly visible therein. It has a density of 0.4 gm/cc and is useful for the same purposes as the product of the first run.

In a third run, the procedure and parameters of the first run are paralleled, except that waste plate glass is substituted for used-container glass and the treating agent is used in 10 lb. amount. The treating agent is heat treated excreta prepared by heating solid particulate steer excreta to about 600°C and holding it in a closed system for about 30 minutes to provide the solid residue with the following approximate composition:

| Constituents | Wt. - % |
|---|---|
| Carbon | 15 |
| Silicon | 25 |
| Aluminum | 5 |
| Hydrogen | 2 |

The heat treating temperature of the mix is 900°C and residence time 20 minutes at atmospheric pressure. A low melting glaze is added to the heat treated product before cooling thereof. Comparable results are obtained to those of the previous runs, except that the density of the product is greater, namely, 0.5 gm/cc.

EXAMPLE II

In a fourth run, the procedure and parameters of the first run of Example I are generally followed, except that the amount of heat treated animal excreta product mixed with the used-container glass is 5 lbs. Moreover, the excreta product has been prepared from steer excreta by heat treating it in dried particulate form at 600°C for 20 minutes in a closed container with removal of volatiles. Such product has the following approximate composition:

| Constituents | Wt. - % |
|---|---|
| Carbon | 40 |
| Silicon | 9 |
| Aluminum | 3 |
| Hydrogen | 1 |

The used-container glass has an average reflectance of about 5-95 percent and the following approximate concentrations of foreign inclusions:

| Foreign Inclusions | % by Wt. |
|---|---|
| Fe | 0.1-3 |
| Sn | 0.1-2 |
| Al | 0.1-2 |
| Other metals | 0.1-1 |
| Cellulosics | 0.1-1 |
| Other organics | 0.1-1 |

The heat treating of the mix is carried out at 900°C and at an increased pressure of about 1000 psi over a residence time of about 2 minutes, after which the pressed product is cooled over 1 hour to room temperature and recovered as a hard, smooth, strong, slate-like product having a tensile strength of about psi and a density of 1.9 gm/cc. Such product is non-flammable, capable of withstanding thermal shock and is inexpensive and durable. It has a distinctive dark, mottled appearance with an average reflectance of 10 percent. It is useful as roofing material, floor and wall tile, artificial slate and artificial marble.

In a fifth run, the procedure and parameters of the fourth run are followed, except that the treating agent comprises heat treated excreta prepared by heating dried particulate human excreta to 600°C and holding if for 30 minutes within a closed system while removing volatiles therefrom. The solid residue has the following approximate composition:

| Constituents | Wt. - % |
|---|---|
| Carbon | 18 |
| Silicon | 17 |
| Aluminum | 2 |
| Hydrogen | 2 |

The treating agent is used in 50 lb. amount in the mix. Moreover, the heat treating temperature of the mix is 800°C, pressure is 2,000 psi and residence time is 5 minutes. Before cooling is effected, ferric oxide powder is sprinkled on surfaces of the glass product and the product is pressed again at 1,000 psi for about 1 minute. The finished product obtained after cooling has a tensile strength of 6,000 psi, density of 2.0 gm/cc and a distinctive multi-colored appearance with an average reflectance of 20 percent. It is useful for the same purposes as described for the product of the fourth run.

In a sixth run, the procedure and parameters of the fourth run are followed, except that glass is cullet and the filler is heat treated excreta prepared by heating particulate hog excreta to about 600°C and holding it for about 20 mins., said temperature within a closed system while removing volatiles to obtain a product having the following approximate composition:

| Constituents | Wt. - % |
|---|---|
| Carbon | 25 |
| Silicon | 15 |
| Aluminum | 3 |
| Hydrogen | 3 |

The filler is used in 40 lb. amount in the mix. Heat treating conditions for the mix are as follows: Temperature 850°C, pressure 500 psi, and residence time 20 minutes. Moreover, before cooling, the pressed product is bonded to a clear glass sheet under 500 psi pressure and 700°C temperature to provide a finished product with 70 percent average reflectance, 5,000 psi tensile strength and 2.1 gm/cc density. It is of distinctive, multi-colored appearance, with a hard glossy surface and is particularly useful as decorative tile.

Accordingly, an improved method, glass mix and glass products are provided. The products are of distinctive appearance and are inexpensive to make by the present method. They provide an effective solution to the present ecological problem of disposing of large quantities of waste glass and animal excreta.

Various modifications, changes, alterations and additions can be made in the present method and its steps, and in the present mix and the present glass products. All such modifications, changes, alterations and additions as are within the scope of the appended claims form part of the present invention.

I claim:

1. An improved method of making glass products, which method comprises:
   a. mixing particulate glass together with selected treating agent comprising particulate excreta heat treated at about 200°-1,000°C until the carbon content thereof has increased to about 15-50 percent by weight;
   b. heating the resulting mix to a temperature and pressure within a range sufficient to sinter and soften said glass and activate said treating agent but insufficient to melt said glass;
   c. maintaining said mix within said range until said glass has been converted into a coherent mass; and
   d. thereupon cooling said glass to below the solidification point thereof and recovering the finished glass product.

2. The method of claim 1 wherein said pressure is substantially atmospheric to foam said glass.

3. The method of claim 2 wherein said treating agent is in a concentration of about 0.5–10 percent by weight of said mix.

4. The method of claim 2 wherein said temperature range is between about 600° and 900°C and wherein said mix is held within said range until foaming is substantially completed.

5. The method of claim 1 wherein said foaming agent comprises heat treated human excreta.

6. The method of claim 1 wherein said treating agent comprises heat treated livestock excreta.

7. The method of claim 1 wherein said treating agent comprises heat treated poultry excreta.

8. The method of claim 1 wherein said mix is pressed within said range at a pressure of about 10–10,000 psi to form a hard, glassy pressed product.

9. The method of claim 8 wherein said temperature range is about 500°–1,000°C.

10. The method of claim 8 wherein said treating agent is in a concentration of about 10–80 percent by weight of said mix.

11. The method of claim 9 wherein said treating agent is in a concentration of about 50 percent by weight of said mix and oxide pigment is embedded in the surface of said pressed product.

12. The method of claim 9 wherein said pressing is carried out for about one second to about one hour.

13. The method of claim 1 wherein said glass comprises used-container glass having the following approximate concentrations of foreign inclusions mixed therewith:

| Inclusions | % by Wt. in Glass |
|---|---|
| Fe | 0.1 to 3 |
| Sn | 0.1 to 2 |
| Al | 0.1 to 2 |
| Other Metals | 0.1 to 1 |
| Cellulosics | 0.1 to 1 |
| Other organics | 0.1 to 1 | said used-container glass having an average reflectance of between about 5 percent and about 95 percent.

* * * * *

PO-1050
(5/69)

UNITED STATES PATENT OFFICE
CERTIFICATE OF CORRECTION

Patent No. 3,811,851    Dated May 21, 1974

Inventor(s) John D. Mackenzie

It is certified that error appears in the above-identified patent and that said Letters Patent are hereby corrected as shown below:

Column 1, lines 50-51, change "desirable" to

--undesirable--.

Column 10, line      change "foaming" to --treating--.

Signed and sealed this 26th day of November 1974.

(SEAL)
Attest:

McCOY M. GIBSON JR.
Attesting Officer

C. MARSHALL DANN
Commissioner of Patents